US009871805B2

(12) United States Patent
Cuff et al.

(10) Patent No.: US 9,871,805 B2
(45) Date of Patent: Jan. 16, 2018

(54) USER AUTHENTICATION

(71) Applicant: TOKEN ONE PTY LTD, New South Wales (AU)

(72) Inventors: Philip Anthony Frederick Cuff, New South Wales (AU); Sebastien John Eckersley-Maslin, New South Wales (AU); Kamil Kreiser, New South Wales (AU); Jeremy Wayne Paddison, New South Wales (AU); David Robert Grieve, New South Wales (AU)

(73) Assignee: TOKEN ONE PTY LTD, New South Wales (AU)

(*) Notice: Subject to any disclaimer, the term of this patent is extended or adjusted under 35 U.S.C. 154(b) by 0 days.

(21) Appl. No.: 14/767,720

(22) PCT Filed: Apr. 30, 2014

(86) PCT No.: PCT/AU2014/050024
§ 371 (c)(1),
(2) Date: Aug. 13, 2015

(87) PCT Pub. No.: WO2014/176645
PCT Pub. Date: Nov. 6, 2014

(65) Prior Publication Data
US 2016/0099950 A1 Apr. 7, 2016

(30) Foreign Application Priority Data
Apr. 30, 2013 (AU) .................................. 2013901504

(51) Int. Cl.
H04L 29/06 (2006.01)
G06F 21/00 (2013.01)
(Continued)

(52) U.S. Cl.
CPC .............. *H04L 63/12* (2013.01); *G06F 21/00* (2013.01); *G06F 21/36* (2013.01); *G06Q 20/40* (2013.01);
(Continued)

(58) Field of Classification Search
CPC ......... H04L 63/12; G06F 21/00; G06F 21/36; G06Q 20/40
See application file for complete search history.

(56) References Cited

U.S. PATENT DOCUMENTS 7,181,433 B2  2/2007 Yousofi
7,996,861 B1  8/2011 Delpuch
(Continued)

FOREIGN PATENT DOCUMENTS

GB  2433147 A  * 6/2007  ............. G06F 21/31
GB  2488310    8/2012

OTHER PUBLICATIONS

International Search Report corresponding to International Application No. PCT/AU2014/050024.
(Continued)

*Primary Examiner* — Ellen Tran
(74) *Attorney, Agent, or Firm* — Niels Haun; Dann, Dorfman, Herrell & Skillman, P.C.

(57) ABSTRACT

A method, system, server processing system and computer readable medium for authenticating a user attempting to access a secure environment is disclosed. In one aspect, the server processing system is configured to: receive an authentication request to authenticate the user attempting to access the secure environment; transfer, to the user or a user device associated with the user, an index corresponding to a selected key from a keymap; receive data indicative of a code which is based on the selected key presented by the user device and a personal identifier, and determine, using
(Continued)

the code whether the user is authenticated. Advantageously, the server processing system never stores nor receives data directly indicative of the personal identifier such that no one else is able to determine the personal identifier, not even an employee of the secure environment which the user is attempting to access.

18 Claims, 7 Drawing Sheets

(51) Int. Cl.
    *G06Q 20/40*     (2012.01)
    *G06F 21/36*     (2013.01)
(52) U.S. Cl.
    CPC .......... *H04L 63/06* (2013.01); *H04L 63/0838* (2013.01); *H04L 63/10* (2013.01); *G06F 2221/2149* (2013.01)

(56) References Cited

U.S. PATENT DOCUMENTS

| | | |
|---|---|---|
| 2001/0037468 A1 | 11/2001 | Gaddis |
| 2003/0023880 A1 | 1/2003 | Edwards |
| 2007/0143831 A1 | 6/2007 | Pearson et al. |
| 2008/0141362 A1 | 6/2008 | Torres et al. |
| 2009/0328203 A1 | 12/2009 | Haas |
| 2010/0116877 A1* | 5/2010 | Parmelee ................ G07F 19/20 235/379 |
| 2010/0281526 A1* | 11/2010 | Raghavan ............. H04L 63/083 726/7 |

OTHER PUBLICATIONS

Written Opinion of the International Preliminary Examining Authority corresponding to International Application No. PCT/AU2014/050024.

* cited by examiner

USER AUTHENTICATION

RELATED APPLICATIONS

This application is a 371 application of International Application No. PCT/AU2014/050024 filed Apr. 30, 2014, which claims the benefit of priority of Australian Patent Application No. 2013901504 filed Apr. 30, 2013. Each of the foregoing applications is hereby incorporated herein by reference.

FIELD OF INVENTION

The present invention relates to a server processing system, method, computer readable medium, and system for user authentication.

BACKGROUND

Generally when a user requires access to a secure environment, such as a secure webpage, authentication of the user is required prior to granting access to the secure environment. A number of methods currently exist.

A very common technique is to request the user to provide a user identity and password. In most instances, the user identity and password are encrypted and transferred to a server processing system for user authentication. Problems exist with this type of authentication technique. For example, malicious software (i.e. keylogging software) operating on a terminal can log the user input, wherein the captured user identity and password can be maliciously used in later fraudulent activities.

Biometric authentication techniques have also been used to authenticate a user requesting access to a secure environment. However, as biometric features of a user cannot be altered, there are significant drawbacks in the event that the biometric feature(s) of the user has been compromised.

Physical tokens such as smart cards and the like have also been used as a means to authenticate a user requesting access to a secure environment. However, such devices are inconvenient to a user who may not carry the device with them at all times, and do not actually confirm that the user presenting the physical token is actually the correct user requesting authentication, merely that the device was present at the moment of authentication.

SUMMARY

In a first aspect there is provided a server processing system for authenticating a user attempting to access a secure environment controlled by a remote server processing system, wherein the server processing system is configured to:
  receive, from the remote server processing system, an authentication request to authenticate the user attempting to access the secure environment;
  transfer, to the user or a user device associated with the user, an index corresponding to a selected key from a keymap, wherein the keymap is stored in memory of the user device and in server accessible memory;
  receive data indicative of a code, wherein the user determines the code based on the selected key presented by the user device and a personal identifier;
  determine a hash value of the personal identifier using the code and the selected key stored in the server accessible memory;
  compare the determined hash value against a stored hash value associated with a user account stored in the server accessible memory; and
  transfer an authentication response to the remote server processing system, wherein the response is indicative of whether the user is authenticated for accessing the secure environment based on the comparison.

In certain embodiments, the user attempts to access the secure environment from one of:
  a user processing system which is independent to the user device; or
  the user device.

In certain embodiments, the user device is a portable processing system.

In certain embodiments, the server processing system is configured to:
  receive a registration request indicative of:
    identity data which attempts to prove the identity of the user; and
    a unique device profile identifying the user device;
  verify the identity of the user based on the identity data; and
  generate the user account based on a positive verification of the identity of the user, wherein the user device is associated with the user account based on the unique device profile.

In certain embodiments, upon user registration the server processing system is configured to:
  associate the keymap including a plurality of indexed keys with the user account; and
  transfer, to the user device, data indicative of the keymap for storage in memory of the user device.

In certain embodiments, the server processing system is configured to:
  receive a personal identifier registration request from the user;
  transfer, to the user device or the user, an index indicative of a selected key from the keymap;
  receive a registration code, wherein the user determines the registration code based on the selected key presented by the user device and a desired personal identifier;
  determine, based on the registration code and the selected key, a hash value of the desired personal identifier; and
  store the hash value in the user account.

In certain embodiments, the server processing system is configured to:
  receive a personal identifier registration request from the user;
  transfer, to the user device or the user, a first index indicative of a first selected key from the keymap;
  receive a registration code, wherein the user determines the registration code based on the first selected key presented by the user device and a desired personal identifier;
  determine, based on the registration code and the first selected key, a first hash value of the desired personal identifier;
  transfer, to the user device or user, a second index indicative of a second selected key from the keymap;
  receive a second registration code, wherein the user determines the second registration code based on the second selected key and the desired personal identifier;
  determine a second hash value using the second registration code and the second selected key corresponding to the second index from the keymap; and store the first or second hash value in the user account in response to the first hash value corresponding to the second hash value.

In certain embodiments, the server processing system is configured to:
receive, from the user, a reset personal identifier request;
facilitate verification of the user's identity;
in response to successful verification, transfer, to the user device or the user, an index of a selected key from the keymap;
receive a reset code, wherein the user determines the reset code based on the selected key presented by the user device and a new personal identifier;
determine, based on the reset code and the selected key, a hash value of the new personal identifier; and
store the hash value of the new personal identifier in the user account.

In certain embodiments, the server processing system is configured to store, in the user account, data indicative of the identity of the user indicated by a digital certificate of the user.

In certain embodiments, the server processing system is configured to receive, from the user device, an index request, wherein in response to receiving the index request the server processing system transfers to the user device the index of the selected key from the keymap.

In a second aspect there is provided a method for authenticating a user attempting to access a secure environment controlled by a remote server processing system, wherein the method includes the server processing system:
receiving, from the remote server processing system, an authentication request to authenticate the user attempting to access the secure environment;
transferring, to the user or a user device associated with the user, an index corresponding to a selected key from a keymap, wherein the keymap is stored in memory of the user device and in server accessible memory;
receiving data indicative of a code, wherein the user determines the code based on the selected key presented by the user device and a personal identifier;
determining, a hash value of the personal identifier using the code and the selected key stored in the server accessible memory;
comparing the determined hash value against a stored hash value associated with a user account stored in the server accessible memory; and
transferring an authentication response to the remote server processing system, wherein the response is indicative of whether the user is authenticated for accessing the secure environment based on the comparison.

In certain embodiments, the user attempts to access the secure environment from one of:
a user processing system which is independent to the user device; or
the user device.

In certain embodiments, the user device is a portable processing system.

In certain embodiments, the method includes the server processing system:
receiving a registration request indicative of:
identity data which attempts to prove the identity of the user; and
a unique device profile identifying the user device;
verifying the identity of the user based on the identity data; and
generating the user account based on a positive verification of the identity of the user, wherein the user device is associated with the user account based on the unique device profile.

In certain embodiments, upon user registration, the method includes the server processing system:
associating the keymap including a plurality of indexed keys with the user account; and
transferring, to the user device, data indicative of the keymap for storage in memory of the user device.

In certain embodiments, the method includes the server processing system:
receiving a personal identifier registration request from the user;
transferring, to the user device or the user, an index indicative of a selected key from the keymap;
receiving a registration code, wherein the user determines the registration code based on the selected key presented by the user device and a desired personal identifier;
determining, based on the registration code and the selected key, a hash value of the desired personal identifier; and
storing the hash value in the user account.

In certain embodiments, the method includes the server processing system:
receiving a personal identifier registration request from the user;
transferring, to the user device or the user, a first index indicative of a first selected key from the keymap;
receiving a first registration code, wherein the user determines the first registration code based on the first selected key presented by the user device and a desired personal identifier;
determining, based on the first registration code and the first selected key, a first hash value of the desired personal identifier
transferring, to the user or user device, a second index indicative of a second selected key from the keymap;
receiving a second registration code, wherein the user determines the second registration code based on the second selected key presented by the user device and the desired personal identifier;
determining a second hash value using the second registration code and the second selected key corresponding to the second index from the keymap; and
storing the first or second hash value in the user account in response to the first hash value corresponding to the second hash value.

In certain embodiments, the method includes the server processing system:
receiving, from the user, a reset personal identifier request;
facilitating verification of the user's identity;
in response to successful verification, transferring, to the user device or the user, an index of a selected key from the keymap;
receiving a reset code, wherein the user determines the reset code based on the selected key and a new personal identifier;
determining, based on the reset code and the selected key, a hash value of the new personal identifier; and
store the hash value of the new personal identifier in the user account.

In certain embodiments, the method includes the server processing system storing, in the user account, data indicative of the identity of the user indicated by a digital certificate of the user.

In certain embodiments, the method includes the server processing system receiving, from the user device, an index request, wherein in response to receiving the index request the server processing system transfers to the user device the index of the selected key from the keymap.

In a third aspect there is provided a computer readable medium for configuring a server processing system to authenticate a user attempting to access a secure environment controlled by a remote server processing system, wherein the computer readable medium includes executable instructions which, upon execution, configure the server processing system to perform the method of the second aspect.

In a fourth aspect there is provided a system for authenticating a user attempting to access a secure environment controlled by a remote server processing system, wherein the system includes a server processing system and a software application, wherein:
the server processing system configured to:
receive, from the remote server processing system, an authentication request to authenticate the user attempting to access the secure environment;
transfer, to the user or a user device associated with the user, an index corresponding to a selected key from a keymap, wherein the keymap is stored in memory of the user device and in server accessible memory;
receive data indicative of a code, wherein the user determines the code based on the selected key presented by the user device and a personal identifier;
determine a hash value of the personal identifier using the code and the selected key stored in the server accessible memory;
compare the determined hash value against a stored hash value associated with a user account stored in the server accessible memory; and
transfer an authentication response to the remote server processing system, wherein the response is indicative of whether the user is authenticated for accessing the secure environment based on the comparison; and
the software application is executable by the user device to configure the user device to:
receive the keymap;
store the keymap in memory of the user device; and
present the selected key to the user from the keymap based on the index.

In a fifth aspect there is provided a server processing system for enabling a user to reset a personal identifier used for authenticating a user to access a secure environment controlled by a remote server processing system, wherein the server processing system is configured to:
receive, from the user, a reset personal identifier request;
facilitate verification of the user's identity;
in response to successful verification, transfer, to the user device or the user, an index corresponding to a selected key from a keymap associated with a user account, wherein the keymap is stored in the memory of the user device and in server accessible memory;
receive a reset code, wherein the user determines the reset code based on the selected keymap and a new personal identifier;
determine, based on the reset code and the selected key, a hash value of the new personal identifier; and
store the hash value of the new personal identifier in the user account.

In a sixth aspect there is provided a method for resetting a personal identifier for authenticating a user to access a secure environment controlled by a remote server processing system, wherein the method includes the server processing system:
receiving, from the user, a reset personal identifier request;
facilitating verification of the user's identity;
in response to successful verification, transferring, to the user device or the user, an index corresponding to a selected key from a keymap associated with a user account, wherein the keymap is stored in the memory of the user device and in server accessible memory;
receiving a reset code, wherein the user determines the reset code based on the selected keymap and a new personal identifier;
determining, based on the reset code and the selected key, a hash value of the new personal identifier; and
storing the hash value of the new personal identifier in the user account.

In a seventh aspect there is provided a computer readable medium for configuring a server processing system for enabling a user to reset a personal identifier used for authenticating a user to access a secure environment controlled by a remote server processing system, wherein the computer readable medium includes executable instructions which, upon execution, configure the server processing system to perform the method of the sixth aspect.

Other aspects and embodiments will be realised throughout the detailed description.

BRIEF DESCRIPTION OF THE FIGURES

Example embodiments should become apparent from the following description, which is given by way of example only, of at least one preferred but non-limiting embodiment, described in connection with the accompanying figures.

DESCRIPTION OF THE PREFERRED EMBODIMENTS

Figure 1:
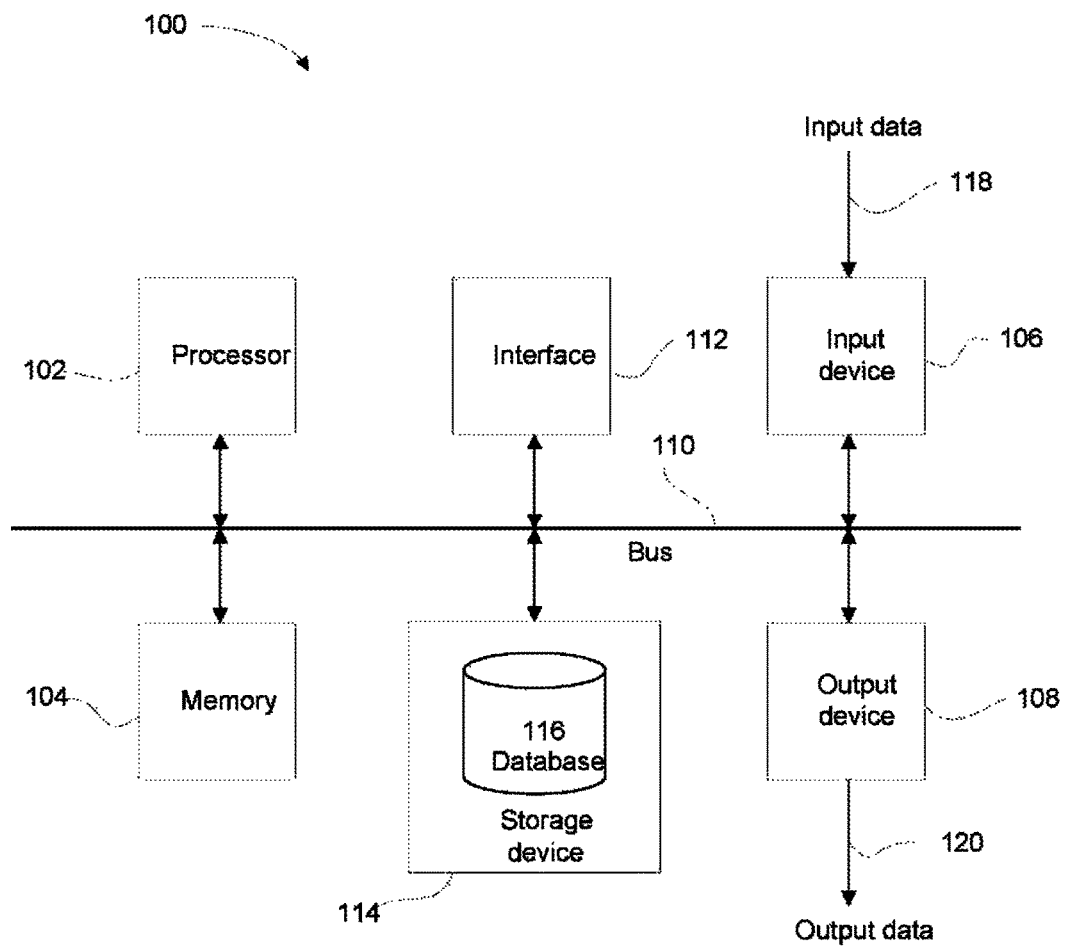
FIG. 1 illustrates a functional block diagram of an example processing system that can be utilised to embody or give effect to a particular embodiment.

The following modes, given by way of example only, are described in order to provide a more precise understanding of the subject matter of a preferred embodiment or embodiments. In the figures, incorporated to illustrate features of an example embodiment, like reference numerals are used to identify like parts throughout the figures.

Example Processing System

A particular embodiment can be realised using a processing system, an example of which is shown in FIG. 1. In particular, the processing system 100 generally includes at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 also can be provided for coupling the processing system 100 to one or more peripheral devices, for example interface 112 could be a PCI card or PC card. At least one storage device 114 which houses at least one database 116 can also be provided. The memory 104 can be any form of memory device, for example, volatile or non-volatile memory, solid state storage devices, magnetic devices, etc. The processor 102 could include more than one distinct processing device, for example to handle different functions within the processing system 100.

Input device 106 receives input data 118 and can include, for example, a keyboard, a pointer device such as a pen-like device or a mouse, audio receiving device for voice controlled activation such as a microphone, data receiver or antenna such as a modem or wireless data adaptor, data acquisition card, etc. Input data 118 could come from different sources, for example keyboard instructions in conjunction with data received via a network. Output device 108 produces or generates output data 120 and can include, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

In use, the processing system 100 is adapted to allow data or information to be stored in and/or retrieved from, via wired or wireless cornmunication means, the at least one database 116 and/or the memory 104. The interface 112 may allow wired and/or wireless communication between the processing unit 102 and peripheral components that may serve a specialised purpose. The processor 102 receives instructions as input data 118 via input device 106 and can display processed results or other output to a user by utilising output device 108. More than one input device 106 and/or output device 108 can be provided. It should be appreciated that the processing system 100 may be any form of terminal, server, specialised hardware, or the like.

Figure 2:
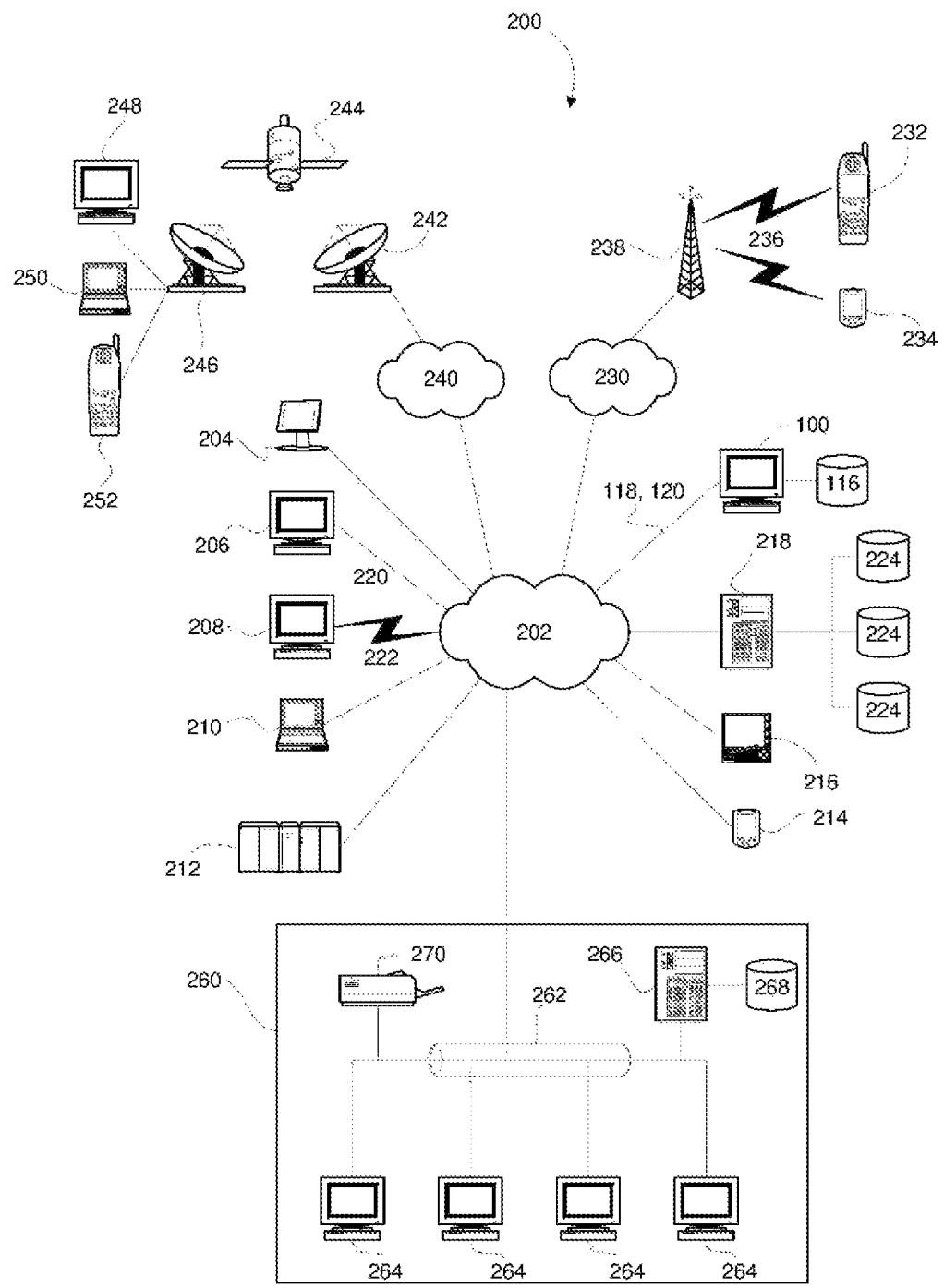
FIG. 2 illustrates an example network infrastructure that can be utilised to embody or give effect to a particular embodiment.

The processing device 100 may be a part of a networked communications system 200, as shown in FIG. 2. Processing device 100 could connect to network 202, for example the Internet or a WAN. Input data 118 and output data 120 could be communicated to other devices via network 202. Other terminals, for example, thin client 204, further processing systems 206 and 208, notebook computer 210, mainframe computer 212. PDA 214, pen-based computer 216, server 218, etc., can be connected to network 202. A large variety of other types of terminals or configurations could be utilised. The transfer of information and/or data over network 202 can be achieved using wired communications means 220 or wireless communications means 222. Server 218 can facilitate the transfer of data between network 202 and one or more databases 224. Server 218 and one or more databases 224 provide an example of an information source.

Other networks may communicate with network 202. For example, telecommunications network 230 could facilitate the transfer of data between network 202 and mobile or cellular telephone 232 or a PDA-type device 234, by utilising wireless communication means 236 and receiving/transmitting station 238. Satellite communications network 240 could communicate with satellite signal receiver 242 which receives data signals from satellite 244 which in turn is in remote communication with satellite signal transmitter 246. Terminals, for example further processing system 248, notebook computer 250 or satellite telephone 252, can thereby communicate with network 202. A local network 260, which for example may be a private network. LAN, etc., may also be connected to network 202. For example, network 202 could be connected with ethernet 262 which connects terminals 264, server 266 which controls the transfer of data to and/or from database 268, and printer 270. Various other types of networks could be utilised.

The processing device 100 is adapted to communicate with other terminals, for example further processing systems 206, 208, by sending and receiving data, 118, 120, to and from the network 202, thereby facilitating possible communication with other components of the networked communications system 200.

Thus, for example, the networks 202, 230, 240 may form part of, or be connected to, the Internet, in which case, the terminals 206, 212, 218, for example, may be web servers. Internet terminals or the like. The networks 202, 230, 240, 260 may be or form part of other communication networks, such as LAN, WAN, ethernet, token ring, FDDI ring, star, etc., networks, or mobile telephone networks, such as GSM, CDMA or 3G, etc., networks, and may be wholly or partially wired, including for example optical fibre, or wireless networks, depending on a particular implementation.

Overview of System

Figure 3:
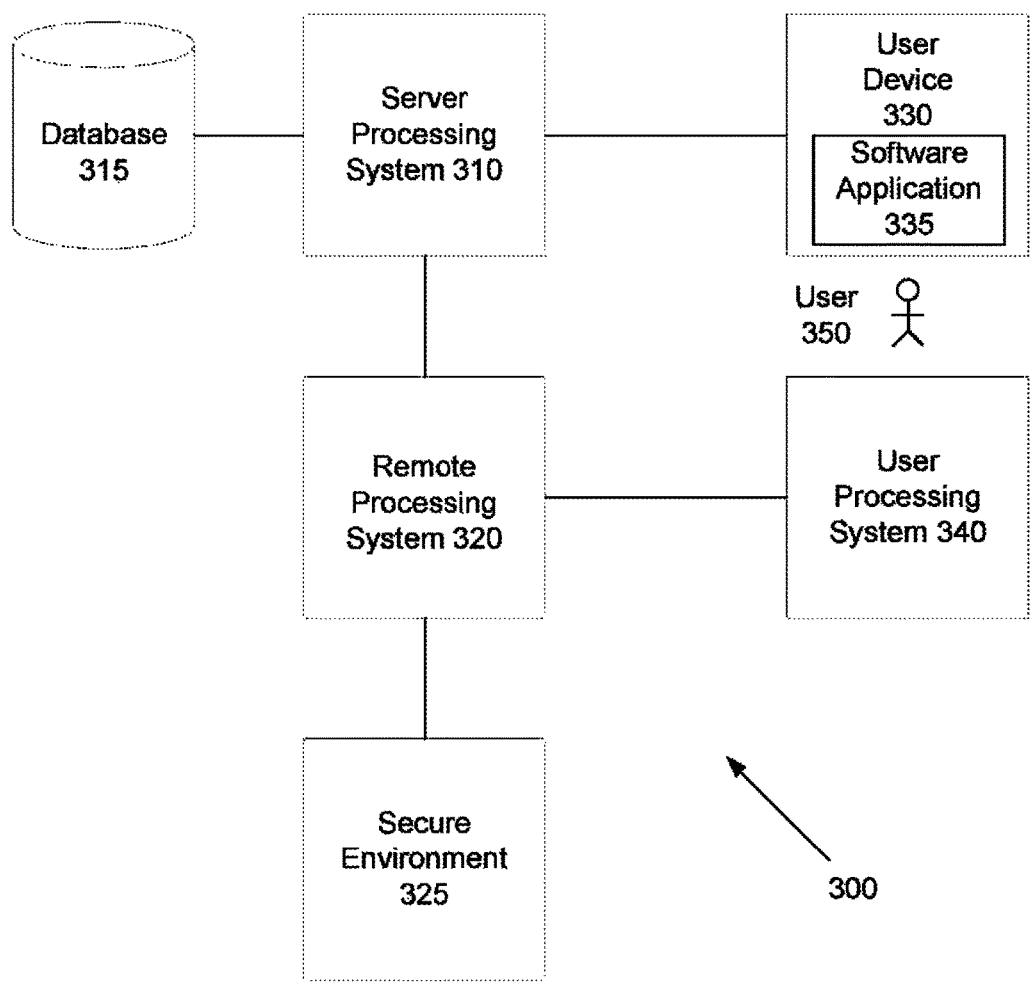
FIG. 3 illustrates a system diagram of a system for authenticating a user attempting to access a secure environment.

Referring to FIG. 3 there is shown a system diagram representing an example system 300 for authenticating a user 350 attempting to access a secure environment 325.

In particular, the system 300 includes a server processing system 310 in data communication, via a data communication means, with a remote server processing system 320. The server processing system 310 has associated therewith server accessible memory 315, provided in the form of a database, which stores account data for authenticating the user 350. The remote processing system 320 controls access to the secure environment 325 which is restricted to authorised users. Examples of the secure environment 325 may include digital environments such as secure websites, secure server services, and the like, or potentially physical environments such as a secure door in the building or the like.

The system 300 can also include a user processing system 340 that is in data communication, via a data communication means, with the remote server processing system 320. The user 350 interacts with the user processing system 340 to transfer a request to the remote server processing system 320 in order to gain access to the secure environment 325. Examples of the user processing system 340 may include a desktop terminal, a laptop, a tablet computer, or the like.

The system 300 also includes a user device 330, independent to the user processing system 340, which is associated with the user 350 and is in data communication, via data communication means, with the server processing system 310. The user device 330 is preferably a portable processing system associated with the user 350, such as a mobile telephone (i.e. such as a "smart phone"), a wearable processing system (i.e. such as Google Glass™), or any other interactive device which is separate to the user processing system 340 and associated with the user 350. The user device 330 has stored in memory a software application 335 (commonly referred to as an "app") which presents an interface to the user for authentication.

In one form, the user processing system is not required. In particular, the user can interact with the user device 330 to transfer a request to the remote server processing system 320 in order to gain access to the secure environment 325.

Registration

Figure 4:
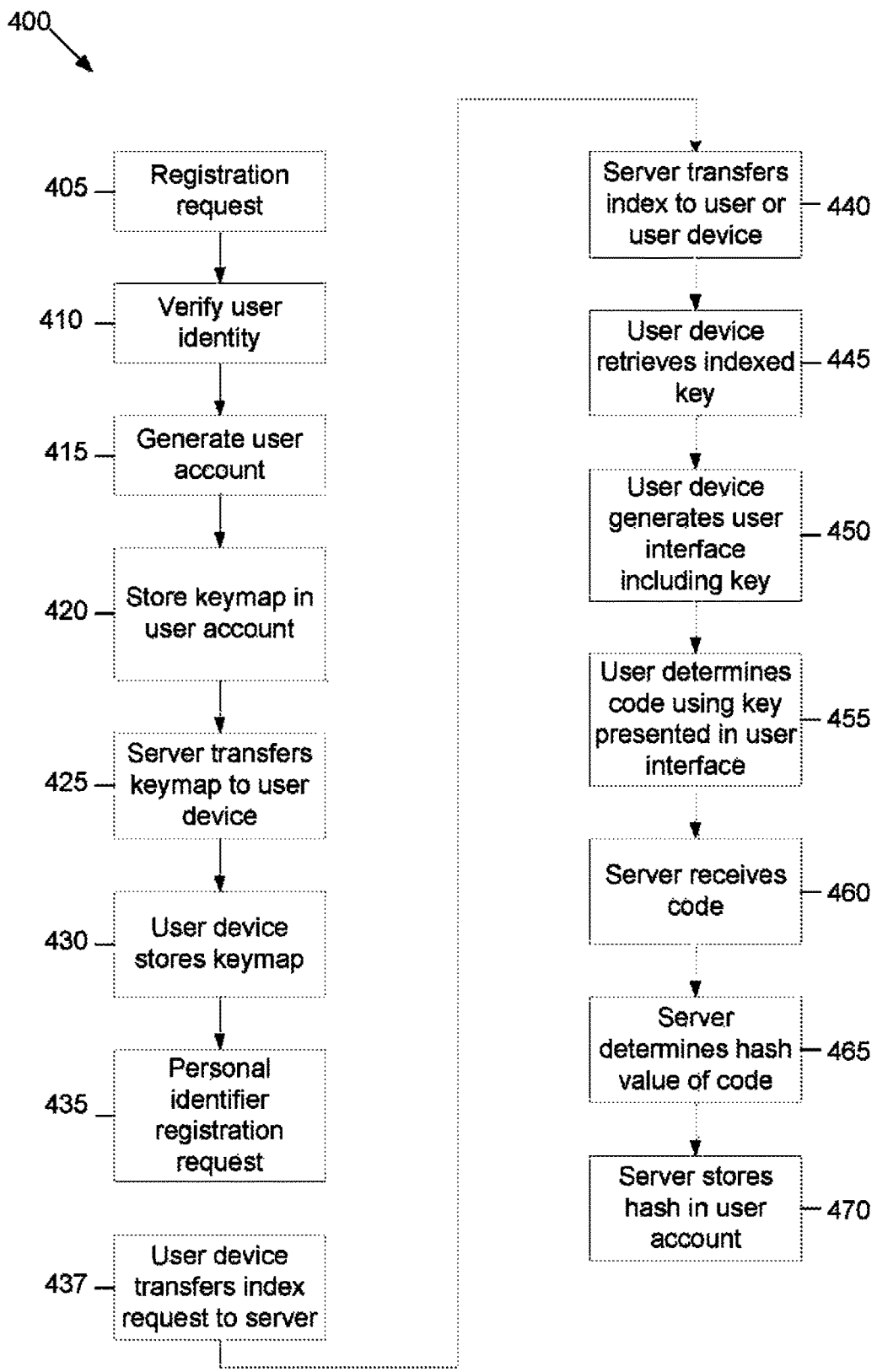
FIG. 4 illustrates a flow chart representing an example method performed by the server processing system to authenticate a user attempting to access a secure environment.

Referring to FIG. 4 there is shown a flowchart representing an example method 400 of a user 350 registering with the server processing system 310 for authenticating the user 350 when accessing the secure environment 325 controlled by the remote server processing system 320.

In particular, at step 405, the method 400 includes the user 350 transferring a registration request to the server processing system 310. The registration request may be transferred from the user device 330 and/or a user processing system 340 operated by the user 350. In particular, in the event that the registration request is submitted at least partially using the user device 330, this may be in response to the user installing the software application 335 on the user device 330, launching the software application 335, and then the user interacting with the software application 335 to submit the registration request. The registration request can be indicative of identity data which attempts to prove the identity of the user 350, and a unique device identifier indicative of the user device 330. The identity data may be indicative of credit card numbers, passport numbers, utility bills, addresses and other like information. In particular embodiments, the unique device identifier is a unique device profile which is generated by the software application 335. The software application 335 determines a number of characteristics of the user device 330 and uses the determined characteristics to generate the unique device profile. The determined characteristics may include one or more characteristics of hardware of the user device 330 (such as the CPU, memory), a MAC address of the user device 330, a software profile which may be indicative of a digital certificate associated with the user and one or more identifiers associated with the user device 330. The software application 335 applies a hashing algorithm to the determined characteristics to generate the unique device profile in the form of a hash value. The unique device profile is then transferred to the server processing system for storage. The unique device profile acts as a device signature to uniquely identify the user device 330 based on multiple characteristics of the user device 330. In particular embodiments, the unique device profile is also stored in memory of the user device 330 and may be used for implementing a security check as will be explained in further detail later herein.

At step 410, the method 400 includes the server processing system 310 facilitating verification of the identity of the user 350 based on the identity data. In particular, a server processing system 310 may utilise an identity verifier (IDV) in an attempt to verify that the set of information is associated with a single user. In response to a positive verification, the method proceeds to step 415. Otherwise the server processing system 310 may request further identification information from the user 350.

At step 415, the method 400 includes the server processing system 310 generating a user account in the memory 315 associated with the server processing system 310. The memory 315 is preferably a database accessible by the server processing system 310. The server processing system 310 associates the user device 330 with the user account based on the unique device identifier which in particular embodiments is the unique device profile.

Figure 6A:
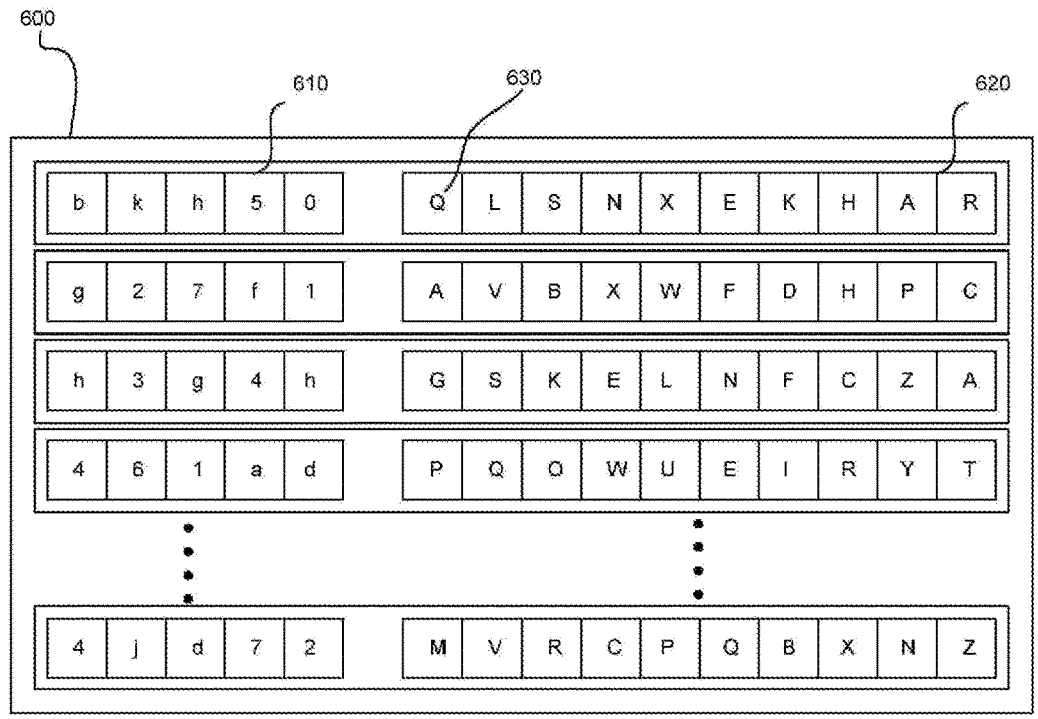
FIG. 6A illustrates an example keymap.

At step 420, the method 400 includes the server processing system 310 storing an association between a keymap 600 and the user account. In particular, each keymap 600 includes plurality of unique keys 620 associated therewith a unique index number 610 (i.e. serial number). An example of a graphical representation of a keymap 650 including a plurality of keys 620 and associated indexes 660 is shown in FIG. 6A. In particular, each key 620 includes a plurality of unique key portions 630. In this example, each key 620 comprises alphabetic key portions, however other forms of keys could be utilised.

At step 425, the method 400 includes the server processing system 310 transferring, to the user device 330, keymap data indicative of the plurality of indexed keys of the keymap 600 associated with the user's account.

At step 430, the method 400 includes the user device 330 storing in local memory the keymap data.

At step 435, the method 400 includes the server processing system 310 receiving a personal identifier registration request from the user 350. The personal identifier registration request may be received from the user processing system 340 or the user device 330. In response, the server processing system transfers to the user processing system 340 or the user device 330 a code request interface for presentation to the user requesting that the user input a code indirectly representing the desired personal identifier. The code request interface may be presented via a web-browser, web-enabled application or the like. The code request interface may be a webpage or a portion of a webpage that is presented to the user 350. For example, the code request interface may be a frame or window located within a webpage hosted by the remote server processing system 320, wherein the code request interface can be generated and hosted by the server processing system 325. As will be discussed in detail below, the code that is input by the user 350 into the code request interface is transferred to the server processing system 310.

At step 437, the method 400 includes the user requesting, via the software application 335 of the user device 330, an index from the server processing system. The request is herein referred to as an index request. The index request is transferred from the user device 330 to the server processing system, wherein the index request can be indicative of the user device profile and/or the identity of the user. The index request may be digitally signed using a private key associated with a digital certificate of the user as will be discussed in more detail herein.

At step 440, in response to receiving the index request, the method 400 includes the server processing system 310 transferring, to the user device 330, an index 610 indicative of a selected key 620 from the keymap 600 associated with the user account. The user device profile and/or the user identity can be used by the server processing system 310 to determine the user account and appropriate keymap. In situations where the code request interface is presented via the user processing system 340 and the user device 330 is not in communication with the server processing system 310, the server processing system 310 can provide the index 610 to the user via the user processing system 340. The user can then manually input the index 610 into the software application 335 using an input device of the user device 330. The user may be required to interact with the user processing system 340 to request transfer and presentation of the index 610 to the user processing system 340.

At step 445, the method includes the user device 330 retrieving the corresponding key 620 from the keymap 600 stored in the local memory based on the received index 610.

Figure 6B:
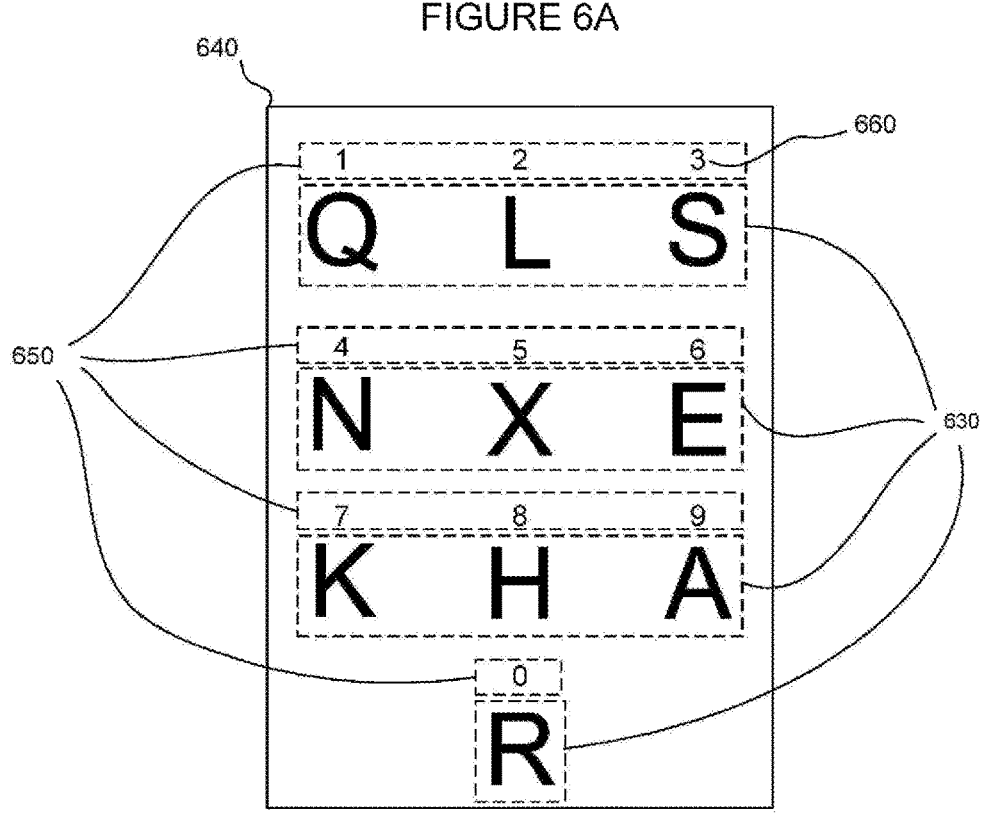
FIG. 6B illustrates an example user interface including a graphical representation of a key and an identifier reference.

At step 450, the method 400 includes the user device 330 generating and displaying a user interface 640 on the user device 330, wherein the user interface 640 of the software application 335 presents a graphical representation of the key 620 and an identifier reference 650. Referring to FIG. 6B, there is shown an example user interface 640 which presents the identifier reference 650 as a numerical display including ten keys for the digits 0 to 9 in ascending order. As shown in FIG. 6B, the key 620 can include a corresponding number of random alphabetic characters. Preferably, as shown in FIG. 6, the user interface 640 presents each key portion 630 adjacent a corresponding identifier reference portion 660 such that each digit of the identifier reference 650 aligns with and is adjacent to the corresponding key portion 630 of the key 620. It will be appreciated that other configurations of alphanumerical data can be used for the key 620 and the identifier reference 650.

At step 455, the method 400 includes the user 350 determining the code using the presented key and the desired personal identifier. In one form, the user can visually inspect the interface 640 presented and determine the code. For example, for each digit of the desired personal identifier, the user 350 identifies the key portion 630 which corresponds to this digit 660 in the identifier reference 650. The key portions 630 are concatenated together by the user to form the code. Based on the interface presented in FIG. 6B, if the user's desired personal identifier is "1032", the code for the user 350 is "QRSL". In the event that the user 350 is using the user device 330 to set the personal identifier, the user can interact with an input device of the user device 330 to input the code into the code request interface wherein the code indirectly represents the desired personal identifier. Alternatively, if the user is using the user processing system 340 to obtain access to the secure environment, the user can input, using an input device of the user processing system 340, the code into the code request interface presented by the user processing system 340.

At step 460, the method 400 includes the user device 330 or the user processing system 340 transferring, to the server processing system 310, a response indicative of the code input by the user 350 into the code request interface. The code request interface presented by the user device 330 or user processing system 340 can include a submit button, wherein the code can be transferred from the user device 330 or user processing system 340 to the server processing system 310 via user selection of the submit button At step 465, the method 400 includes the server processing system 310 determining a hash value based on the code and the selected key 620. In particular, the server processing system 310 provides input variables of the received code, the selected key 620 from the keymap 600 which corresponds to the index 610 sent in step 440, and a salt value associated with the user 350, into a hashing algorithm executed by the server processing system 310 to generate the hash value. Preferably, the hashing algorithm is a one-way hashing algorithm such as SHA-3, MD5 or variants thereof. It will be appreciated that the hashing algoritun can utilise commutative cipher techniques such that the personal identifier does not need to be identified by the server processing system 310.

At step 470 the method 400 includes the server processing system 310 storing the hash value in the user account in the database. Advantageously, the server processing system 310 never stores the personal identifier of the user, nor does the server processing system 310 receive data directly indicative of the personal identifier, thereby providing significant security benefits. These security benefits include, in some embodiments, an outcome where the user 350 knows their personal identifier but no one else is able to determine the personal identifier, not even an employee of the secure environment 325 which the user 350 is attempting to access.

It will be appreciated that the server processing system 310 may repeat steps 440 to 465 to obtain two hash values. In particular, the server processing system 310 can transfer to the user device 330 (or the user via the user processing system if the user device 330 is not in communication with the server processing system 310) another index 610 which is different to the initial index. The server processing system 310 then calculates a second hash value based on a further code received from the user, wherein in the event that the hash values are congruent (i.e. match), the hash value (i.e. the first or second hash value since both are the same) is stored in the database. In the event that the hash values do not match, this indicates that the user 350 has incorrectly indicated non-congruent desired personal identifiers. The registration process thereby ends or the user 350 is requested to repeat the registration process again.

Authentication

Figure 5:
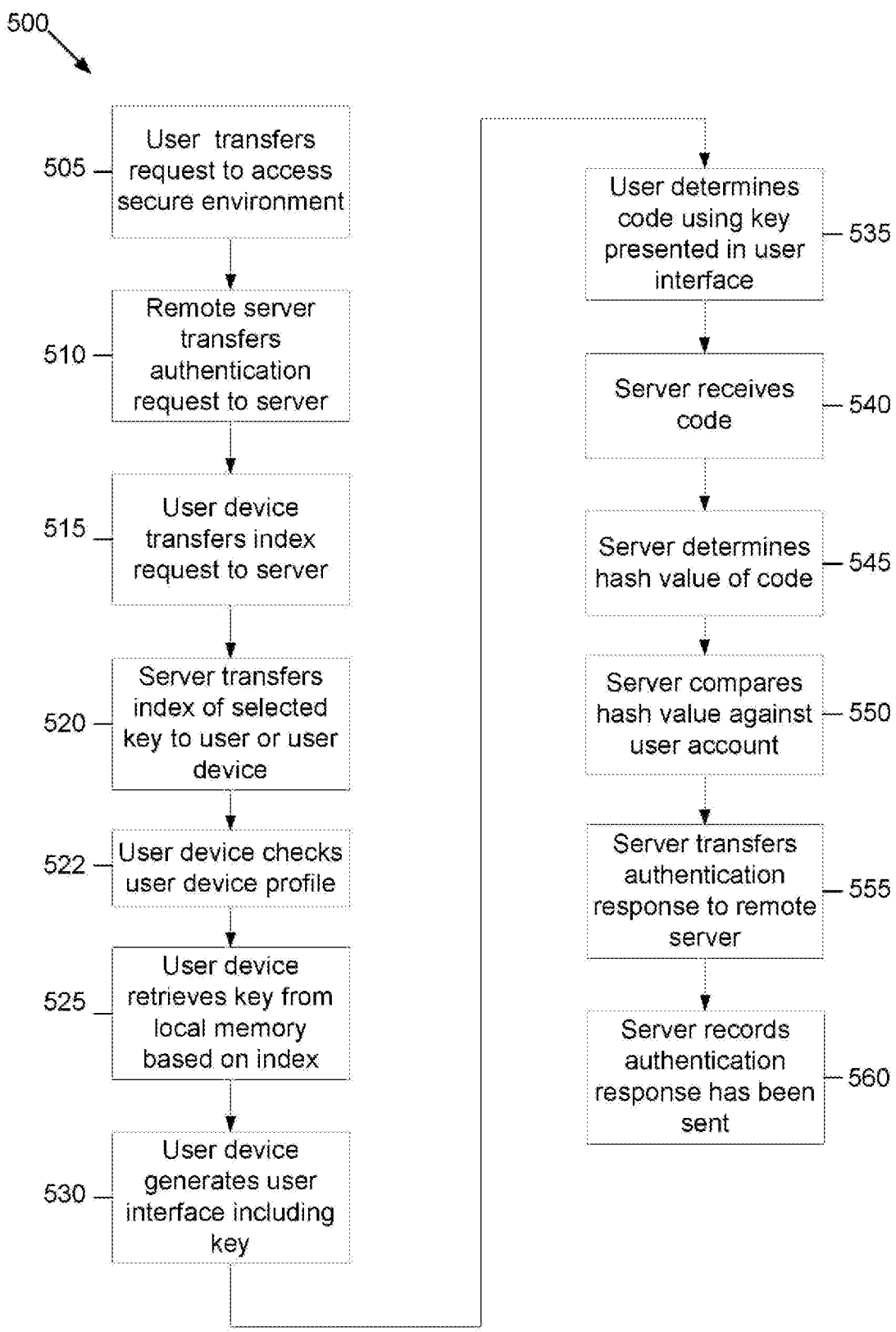
FIG. 5 illustrates a flow chart representing an example method of user registering to use an authentication service offered by the server processing system.

Referring to FIG. 5 there is shown a flowchart representing an example method of the server processing system 310 authenticating a user 350 attempting to access the secure environment 325 hosted by the remote server processing system 320.

In particular, at step 505, the method 500 includes the user 350 operating the user processing system 340 or the user device 330 to transfer a request to access the secure environment 325 from the remote server processing system 320. The request may be submitted via a web-browser, web-enabled application or the like.

At step 510, the method 500 includes the remote server processing system 320 transferring an authentication request to the server processing system 310 to authenticate the user 350. The authentication request is indicative of the user requesting access to the secure environment. In a preferable form, the remote server processing system 320 may digitally sign the request using a digital certificate verifying the identity of the remote server processing system 320 to the server processing system 310. The server processing system 310 may then facilitate verification of the identity of the remote server processing system 320 based on the digitally signed request to ensure the request has been received from an identifiable entity. The server processing system 310 records in the database 315 that an authentication request has been received for the user 350 and associates a timestamp with this request.

In response to request to access the secure environment 325 from the remote server processing system 320, the remote server processing system 320 transfers to the requesting device 330 or 340 an interface including the code request interface hosted by the server processing system 310. The code request interface may be presented via a web-browser, web-enabled application or the like.

As step 515, the method 500 includes the user 350 interacting with the software application 335 of user device 330 to transfer an index request to the server processing system 310, such that the server processing system selects of an index 610 of a key 620 from the user's keymap 600 for authenticating the user 350. In a preferable form, the server processing system 310 is required to receive the index request from the user 350 within a temporal threshold period, otherwise the server processing system 310 will send an authentication response to the remote server processing system 320 indicating that the user 350 is not authenticated to access the secure environment 325. To send the request, the user 350 may launch the software application 335 on the user device 330 to initiate the transfer of the index request. At this time, the user device 330 may also digitally sign the index request by using a private key of the user's digital certificate to enable the server processing system 310 to verify the user's identity using the corresponding public key. In the event that the digital signature does not successfully verify the identity of the user 350, the server processing system 310 can transfer an authentication response to the remote server processing system 320 indicating that the user 350 is not authenticated to access the secure environment 325.

At step 520, the method 500 includes the remote server processing system 320 transferring, to the software application of the user device 330 associated with the user 350, data indicative of the index 610 of the selected key 620 from the keymap 600 associated with the user's account. The server processing system 310 records in the user account a challenge being issued indicative of the selected index 610. As discussed previously, in the event that the user device 330 is not in data communication with the server processing system 310, the server processing system 310 can transfer data indicative of the index of the selected index 610 to the user processing system 340 for presentation to the user 350. The user 350 can then manually input into the software application 335 the presented index via an input device of the user device 330 such that the user device 330 has successfully received the index. The user 350 may be required to interact with the user processing system 340 to request transfer of the index 610 to the user processing system 340.

Optionally at step 522, the method includes the user device 330 performing a security check. In particular, the software application 335 determines the one or more user device characteristics to generate the user device profile as previously discussed earlier in this document. The software application 335 then compares the newly generated user device profile against the user device profile stored in memory of the user device 330. In the event of a successful comparison, the method proceeds to step 525, otherwise the method ends. This process can identify if tampering has occurred to the user device 330.

At step 525, the method 500 includes the software application 335 of the user device 330 retrieving from local memory the key 620 corresponding to the index 610 from the keymap 600.

At step 530, the method 500 includes the software application 335 of the user device 330 generating and displaying a user interface 600 on the user device 330, wherein the user interface 600 presents a graphical representation of the key 620 and the identifier reference 650. This process is performed similarly to step 450 discussed above.

At step 535, the method 500 includes the user 350 using the user interface 640 of the software application 335 presented by user device 330 to determine the code. The step is performed similarly to step 455 discussed above except the user inputs, via the code request interface, key portions that correspond to the portions of the set personal identifier rather than the desired personal identifier.

At step 540, the method 500 includes the user processing system 340 or the user device 330 transferring, via the code request interface and to the server processing system 310, data indicative of the code input by the user 350.

The server processing system 310 may be configured to determine if the challenge response has been received within a temporal threshold period of the initial authentication request being received and/or the challenge request being issued. In the event that the response has not been received within the temporal threshold period, the server processing system 310 may transfer an authentication response to the remote server processing system 320 indicating that the user is not authenticated for accessing the secure environment 325.

At step 545, the method 500 includes the server processing system 310 determining a hash value based on the code and the selected key 620. In particular, the server processing system 310 provides input variables of the received code, the selected key 620 corresponding to the index 610 received by the user device 330, and a salt value associated with the user 350, into a hashing algorithm executed by the server processing system 310 to generate the hash value. Preferably, the hashing algorithm is a one-way hashing algorithm such as SHA-3, MD5 or variants thereof. It will be appreciated that the hashing algorithm can utilise commutative cipher techniques such that the personal identifier does not need to be identified by the server processing system 310.

At step 550, the method 500 includes the server processing system 310 comparing the determined hash value against the stored hash value in the user account. Advantageously, the server processing system 310 never obtains or receives the personal identifier of the user thereby providing significant security benefits. These security benefits include, in some embodiments, an outcome where the user 350 knows their personal identifier but no one else is able to determine the personal identifier, not even an employee of the secure environment 325 which the user 350 is attempting to access.

At step 555, the method 500 includes the server processing system 310 generating and transferring an authentication response to the remote server processing system 320, wherein the authentication response is indicative of whether the user 350 is authenticated to access to the secure environment 325 based upon the comparison in step 550. In particular, in the event that the hash values do not correspond in the comparison performed in step 550, the server processing system 310 generates and transfers an authentication response indicating that the user 350 should not be granted access to the secure environment 325 controlled by the remote server processing system 320. However, in the event that the hash values do correspond in the comparison performed in step 560, the server processing system 310 generates and transfers an authentication response indicating that the user 350 should be granted access to the secure environment 325 controlled by the remote server processing system 320.

At step 560, the method 500 includes the server processing system 310 recording in the user account that the challenge response has been received and the authentication response has been transferred to the remote server processing system 320.

It will be appreciated that if the user 350 incorrectly enters the code via the user processing system 340, the server processing system 310 may re-issue one or more further challenge requests, wherein a unique and different index 610 is transferred in each challenge request. Upon a threshold number of incorrect codes being identified by the server processing system 310 for the single authentication request by the remote server processing system 320, the server processing system 310 can generate and transfer an authentication response to the remote server processing system 320 indicating that the user 350 should not be granted access to the secure environment 325.

Resetting the Personal Identifier

Figure 7:
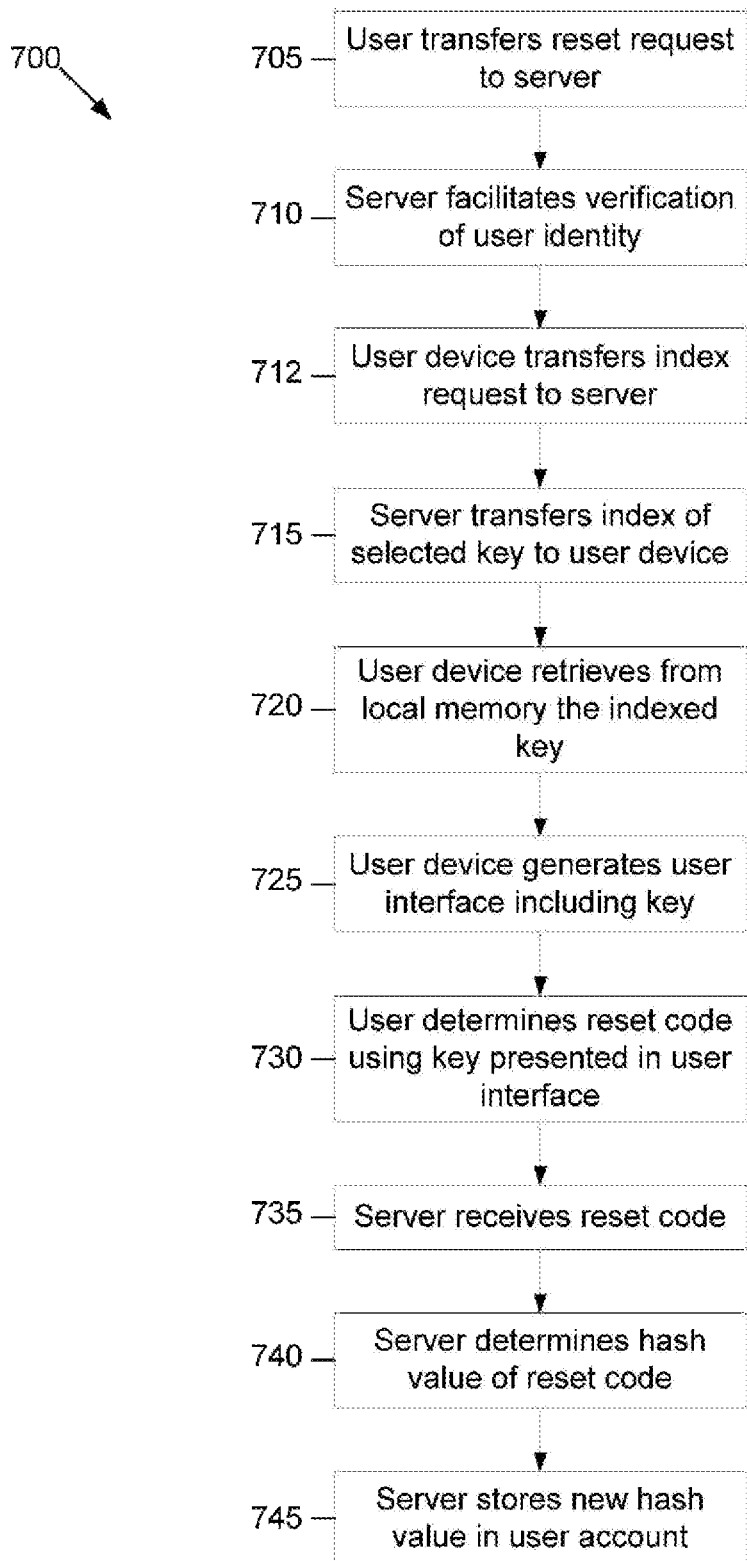
FIG. 7 illustrates a flow chart representing an example method of a user resetting a personal identifier for use in authenticating the user.

Referring to FIG. 7 there is shown a flowchart representing a method of a user 350 transferring a reset request to the server processing system 310.

In particular, at step 705, the method includes the user 350 transferring a reset request to the server processing system 310 to reset the user's personal identifier. The reset request can be sent from the user processing system 340 or the user device 330 potentially via the software application 335. The reset request can include data which can be used by the server processing system, or the IDV, to verify the identity of the user.

At step 710, the server processing system 310 facilitates verification of the user's identity. In response to successful verification of the user's identity, a code request interface, hosted by the server processing system, is presented to the user 350 via the user device 330 or the user processing system 340 and the method 700 proceeds to step 712, otherwise the resetting process ends.

At step 712, the user 350 interacts with the software application 335 of the user device 335 to transfer an index request to the server processing system 340.

At step 715, the method 700 includes the server processing system 310 transferring, to the user device 330, an index 610 of a selected key 620 from the keymap 600 associated with the user account. As discussed previously, in the event that the user device 330 is not in data communication with the server processing system 310, the server processing system 310 can transfer data indicative of the index 610 of the selected key 620 to the user processing system 340 for presentation to the user 350. The user 350 can then manually input the presented index 610 via an input device of the user device 330 into the software application 335 such that the user device 330 has successfully received the index 610. The user may be required to interact with the user processing system 340 to request transfer of the index 610 to the user processing system 340.

The server processing system 310 can store in the database 315 a record of the reset request being received and the index 610 being transferred to the user, wherein a timestamp is recorded in the database 315 indicative of the time which each of these events occurred.

At step 720, the method 700 includes the software application 335 of the user device 330 retrieving from local memory the key 620 corresponding with the received index 610 from the keymap 600 stored in the memory of the user device 330.

At step 725, the method 700 includes the user device 330 generating and displaying a user interface 600 on the user device 330, wherein the user interface 600 presents a graphical representation of the key 620 and the identifier reference 650. This step is performed similarly to step 450 discussed above.

At step 730, the method 700 includes the user 350 using the user interface presented by the user device to determine the reset code. For example, for each digit of the new personal identifier, the user 350 identifies each key portion 630 which corresponds to the respective digit in the identifier reference 650 and concatenates the corresponding key portions 630 together to form the reset code. Based on the interface presented in FIG. 6B, if the user's new personal identifier is "5732", the reset code input by the user 350 is "XKSL".

At step 735, the method 700 includes the user processing system 340 or the user device transferring, to the server processing system 310 via the code request interface, a response indicative of the reset code input by the user 350.

The server processing system 310 may be configured to determine if the reset code has been received within a temporal threshold period of the reset request or the transfer of the index. In the event that the reset code has not been received within the temporal threshold period, the server processing system 310 may refuse to reset the personal identifier based on the received reset code.

At step 740, the method 700 includes the server processing system 310 determining a hash value based on the reset code and the selected key. In particular, the server processing system 310 provides input variables of the received reset code, the key from the keymap corresponding to the index transferred to the user, and a salt value associated with the user 350, into a hashing algorithm executed by the server processing system 310 to generate the hash value. Preferably, the hashing algorithm is a one-way hashing algorithm such as SHA-3, MD5, or variants thereof.

At step 745, the method 700 includes the server processing system 310 storing the determined hash value of the user's new personal identifier in the user account and deleting the previous hash value corresponding to the user's previous personal identifier. Advantageously, the server processing system 310 never stores the new personal identifier of the user, nor does the server processing system 310 receive data directly indicative of the new personal identifier, thereby providing significant security benefits. These security benefits include, in some embodiments, an outcome where the user 350 knows their personal identifier but no one else is able to determine the personal identifier, not even an employee of the secure environment 325 which the user 350 is attempting to access.

It will be appreciated that steps 710 to 740 may be repeated in order to confirm the user 350 has indirectly identified the same new personal identifier. In the event that the two hash values correspond, the hash value corresponding to the new personal identifier is stored in the user account.

It will be appreciated that although parts of the above process have been described in relation to the user interacting with a user processing system 340, it is possible that the user may use the user device 330 to perform the same steps.

Variations

It will be appreciated that the system illustrated in FIG. 3 only depicts a single user 350 and a single remote server processing system 320. It will be appreciated that the server processing system 310 is preferably in data communication with a plurality of remote server processing systems 320, wherein each remote server processing system 320 controls user access to a respective secure environment 325.

It will also be appreciated that the server processing system 310 is preferably in data communication with a plurality of user devices 330 associated with a respective plurality of users 350, wherein the memory 325 associated with the server processing system 310 stores a plurality of user accounts in order to authenticate the plurality of users 350.

It will be appreciated that the server processing system 310 may be provided in the form of a distributed processing system or a single dedicated processing system.

It will be appreciated that data transferred between various components of the system may utilise encryption and digital signature techniques.

It will be appreciated that other hashing processes can be applied by the server processing system 310. In particular, the server processing system 310 may alternatively determine the user's personal identifier by reversely applying the selected key associated with the index sent in the request to the user device 330. Upon determination, the server processing system 310 may immediately hash the user's personal identifier. The user's personal identifier can then be immediately purged from RAM of the server processing system 310 so that no data is stored by the server processing system 310 which is directly indicative of the user's personal identifier.

It will be appreciated that the IDV may be part of the server processing system 310 or a separate processing system in data communication with the server processing system 310.

Whilst the keys and personal identifiers have been exemplified above as a series alphabetic characters and/or numerical digits, it is possible that other forms of data could be used, such as unique graphical icons, shapes, colours, audible sounds, and the like.

Whilst the security checking process performed at step 522 has been described in relation to the authentication process, it is possible that the security checking process is also performed in methods 400 and 700 to ensure that no malicious tampering has occurred to the user device.

The above embodiments may take the form of an entirely hardware embodiment, an entirely software embodiment, firmware, or an embodiment combining software and hardware aspects.

Many modifications will be apparent to those skilled in the art without departing from the scope of the present invention.

The invention claimed is:

1. A server processing system for authenticating a user attempting to access a secure environment controlled by a secure environment server processing system, wherein the server processing system is configured to:
   (a) set a personal identifier of the user, wherein the server processing system is configured to:
      receive a personal identifier registration request from the user;
      transfer, to the user or a user device of the user, a first index indicative of a first selected key from a plurality of indexed keys stored in memory of the user device;
      receive a registration code, wherein the user determines the registration code based on the first selected key presented by the user device and a desired personal identifier;
      determine, based on the registration code and the first selected key, a hash value which is associated with a user account stored in server accessible memory;
   (b) receive, from the secure environment server processing system, an authentication request to authenticate the user attempting to access the secure environment; and
   (c) attempt to authenticate the user attempting to access the secure environment, wherein the server processing system is configured to:
      transfer, to the user or the user device associated with the user, a second index corresponding to a second selected key from the plurality of indexed keys;
      receive data indicative of a code, wherein the user determines the code based on the second selected key presented by the user device and a personal identifier;
      determine a hash value of the personal identifier using the code and the second selected key;
      compare the determined hash value against the stored hash value associated with the user account; and
      transfer an authentication response to the secure environment server processing system, wherein the response is indicative of whether the user is authenticated for accessing the secure environment based on the comparison.

2. The server processing system according to claim 1, wherein the user attempts to access the secure environment from one of:
   a user processing system which is independent to the user device; or
   the user device.

3. The server processing system according to claim 1, wherein the user device is a portable processing system.

4. The server processing system according to claim 1, wherein the server processing system is further configured to:
   receive a registration request indicative of:
      identity data which attempts to prove the identity of the user; and
      a unique device profile identifying the user device;
   verify the identity of the user based on the identity data; and
   generate the user account based on a positive verification of the identity of the user, wherein the user device is associated with the user account based on the unique device profile.

5. The server processing system according to claim 4, wherein upon user registration the server processing system is further configured to:
   associate the plurality of indexed keys with the user account; and
   transfer, to the user device, data indicative of the plurality of indexed keys for storage in memory of the user device.

6. The server processing system according to claim 1, wherein prior to the hash value being associated with the user account, the server processing system is configured to confirm the user's desired personal identifier, wherein the server processing system is configured to:
   transfer, to the user device or user, a further index indicative of a further selected key from the plurality of indexed keys;
   receive a second registration code, wherein the user determines the second registration code based on the further selected key and the desired personal identifier; and
   confirming the user's desired personal identifier using the first registration code and the second registration code, wherein positive confirmation results in the hash value being associated with the user's account.

7. The server processing system according to claim 5, wherein the server processing system is further configured to:
   receive, from the user, a reset personal identifier request;
   facilitate verification of the user's identity;
   in response to successful verification, transfer, to the user device or the user, an additional index of a selected reset key from the plurality of indexed keys;

receive a reset code, wherein the user determines the reset code based on the selected reset key presented by the user device and a new personal identifier;

determine, based on the reset code and the selected reset key, a further hash value of the new personal identifier; and store the further hash value of the new personal identifier in the user account.

8. The server processing system according to claim 4, wherein the server processing system is further configured to store, in the user account, data indicative of the identity of the user indicated by a digital certificate of the user.

9. The server processing system according to claim 1, wherein the server processing system is further configured to receive, from the user device, an index request, wherein in response to receiving the index request the server processing system transfers to the user device the second index of the second selected key from the plurality of indexed keys.

10. A method for authenticating a user attempting to access a secure environment controlled by a secure environment server processing system, wherein the method includes the server processing system:

a) setting a personal identifier of the user by:
receiving a personal identifier registration request from the user;
transferring, to the user or a user device of the user, a first index indicative of a first selected key from a plurality of indexed keys stored in memory of the user device;
receiving a registration code, wherein the user determines the registration code based on the first selected key presented by the user device and a desired personal identifier;
determining, based on the registration code and the first selected key, a hash value which is associated with a user account stored in server accessible memory;

(b) receiving, from the secure environment server processing system, an authentication request to authenticate the user attempting to access the secure environment; and (c) attempting to authenticate the user attempting to access the secure environment by:
transferring, to the user or the user device associated with the user, a second index corresponding to a second selected key from the plurality of indexed keys;
receiving data indicative of a code, wherein the user determines the code based on the second selected key presented by the user device and a personal identifier;
determining, a hash value of the personal identifier using the code and the second selected key;
comparing the determined hash value against the stored hash value associated with the user account; and
transferring an authentication response to the secure environment server processing system, wherein the response is indicative of whether the user is authenticated for accessing the secure environment based on the comparison.

11. The method according to claim 10, wherein the user attempts to access the secure environment from one of:
a user processing system which is independent to the user device; or
the user device.

12. The method according to claim 10, wherein the user device is a portable processing system.

13. The method according to claim 10, wherein the method further includes the server processing system:
receiving a registration request indicative of:
identity data which attempts to prove the identity of the user; and
a unique device profile identifying the user device;
verifying the identity of the user based on the identity data; and
generating the user account based on a positive verification of the identity of the user, wherein the user device is associated with the user account based on the unique device profile.

14. The method according to claim 13, wherein upon user registration, the method further includes the server processing system:
associating the plurality of indexed keys with the user account; and
transferring, to the user device, data indicative of the plurality of indexed keys for storage in memory of the user device.

15. The method according to claim 14, wherein prior to the hash value being associated with the user account, the method further includes the server processing system confirming the user's desired personal identifier, wherein the method includes the server processing system:
transferring, to the user or the user device, a further index indicative of a further selected key from the plurality of indexed keys;
receiving a second registration code, wherein the user determines the second registration code based on the second selected key presented by the user device and the desired personal identifier; and
confirming the user's desired personal identifier using the first registration code and the second registration code, wherein positive confirmation results in the hash value being associated with the user's account.

16. The method according to claim 14, wherein the method further includes the server processing system:
receiving, from the user, a reset personal identifier request;
facilitating verification of the user's identity;
in response to successful verification, transferring, to the user device or the user, an additional index of a selected reset key from the plurality of indexed keys;
receiving a reset code, wherein the user determines the reset code based on the selected reset key and a new personal identifier;
determining, based on the reset code and the selected reset key, a further hash value of the new personal identifier; and
store the further hash value of the new personal identifier in the user account.

17. The method according to claim 13, wherein the method further includes the server processing system storing, in the user account, data indicative of the identity of the user indicated by a digital certificate of the user.

18. A non-transitory computer readable medium for configuring a server processing system to authenticate a user attempting to access a secure environment controlled by a secure environment server processing system, wherein the computer readable medium includes executable instructions which, upon execution, configure the server processing system to:
(a) set a personal identifier of the user, wherein the server processing system is configured to:
receive a personal identifier registration request from the user;

transfer, to the user or a user device of the user, a first index indicative of a first selected key from a plurality of indexed keys stored in memory of the user device;

receive a registration code, wherein the user determines the registration code based on the first selected key presented by the user device and a desired personal identifier;

determine, based on the registration code and the first selected key, a hash value which is associated with a user account stored in server accessible memory;

(b) receive, from the secure environment server processing system, an authentication request to authenticate the user attempting to access the secure environment; and (c) authenticate the user attempting to access the secure environment, wherein the server processing system is configured to:

transfer, to the user or the user device associated with the user, a second index corresponding to a second selected key from the plurality of indexed keys;

receive data indicative of a code, wherein the user determines the code based on the second selected key presented by the user device and a personal identifier;

determine a hash value of the personal identifier using the code and the second selected key;

compare the determined hash value against a stored hash value associated with the user account; and transfer an authentication response to the secure environment server processing system, wherein the response is indicative of whether the user is authenticated for accessing the secure environment based on the comparison.

* * * * *